AMPLITUDE-DISCRIMINATING SIGNAL TRANSFER CIRCUIT

Filed June 13, 1963 2 Sheets-Sheet 1

INVENTOR:
JOHN G. HUMPHREY.

BY Frank J. Thompson
HIS ATTORNEY.

AMPLITUDE-DISCRIMINATING SIGNAL TRANSFER CIRCUIT

Filed June 13, 1963 2 Sheets-Sheet 2

INVENTOR:
JOHN G. HUMPHREY.

BY Frank J. Thompson
HIS ATTORNEY.

United States Patent Office
3,290,441
Patented Dec. 6, 1966

3,290,441
AMPLITUDE-DISCRIMINATING SIGNAL TRANSFER CIRCUIT

John G. Humphrey, Syracuse, N.Y., assignor to General Electric Company, a corporation of New York
Filed June 13, 1963, Ser. No. 287,640
11 Claims. (Cl. 178—69.5)

This invention relates to an amplitude-discriminating signal transfer circuit and, in particular, to a circuit for separating the synchronizing pulses from a received composite television signal while effecting cancellation of noise signals superimposed upon the composite television signal.

In a television system, synchronization between the scanning operations at the transmitter and at the receiver is accomplished by means of special pulses that are generated at the transmitting station and modulated on the radiated carrier wave. These synchronizing pulses are transmitted during the blanking periods, being superimposed on the horizontal blanking pulses. In accordance with the television standards of the United States, the amplitude of the blanking pulses is 75% of the maximum envelope amplitude, as represented by the peaks of the synchronizing pulses. The synchronizing pulses, free of picture information, are obtained at the receiver by applying the demodulated composite video signal, after D.C. restoration, to a circuit designed to transmit only those amplitudes which are appreciably greater than the blanking pulses.

Noise pulses having amplitudes considerably greater than the amplitude of the synchronizing pulses often become superimposed upon the composite television signal during transmission or reception and tend to upset the synchronization of either the horizontal or vertical sweep circuits in the receiver with resulting picture deterioration. The present invention alleviates this problem by eliminating noise pulses in the synchronizing signal separator circuit of a television receiver.

It is an object of the invention to provide an improved amplitude-discriminating signal transfer circuit which produces an output signal when the amplitude of the input signal lies in a predetermined range defined by a first value and a second value.

It is another object of the invention to provide an improved amplitude-discriminating signal transfer circuit wherein the limits of the predetermined range are automatically varied in accordance with the amplitude of the signal for which an output is desired.

It is another object of the invention to provide an improved synchronizing signal separator circuit in a television receiver which blocks pulses having amplitudes substantially greater than the peak amplitude of the synchronizing pulses.

It is a further object of the invention to provide a synchronizing signal separator circuit in a television receiver which selectively eliminates pulses having amplitudes greater than a predetermined value and which automatically compensates for variations in received signal strength.

It is a further object of the invention to provide such a synchronizing signal separator circuit which produces an automatic gain control potential for use in the television receiver.

In accordance with the present invention, the electrodes of an amplifying device are biased in a manner so that the amplifying device produces an output pulse in response to an input pulse having an amplitude within a range defined by an upper and a lower limit. In accordance with one illustrated embodiment of the invention, a biasing circuit comprising a serially connected resistor and voltage source is connected to the emitter of a transistor while the serial combination of a second resistor, a second voltage source, and a diode are utilized to bias the collector. An input signal is applied to the base of the transistor. The voltage source in the emitter circuit determines the lower limit of the transfer characteristic while the voltage source in the collector circuit determines the upper limit of the transfer characteristic, the magnitude of the voltage sources being selected in accordance with the input amplitude range for which output signals are desired.

In accordance with another feature of the present invention, a synchronizing signal separator circuit for a television receiver utilizes a charged capacitor in conjunction with resistance means in the emitter and collector circuits to provide emitter and collector biasing potentials which are a function of the received signal strength, thereby rendering the transfer characteristic of the circuit independent of received signal strength and effectively eliminating video information and noise pulses superimposed on the composite video signal having amplitudes appreciably greater than the peak amplitude of the synchronizing pulses. The charging circuit for the capacitor also provides a signal proportional to the peak amplitude of the synchronizing pulses for effecting automatic gain control in the receiver.

The subject matter of the invention is particularly pointed out and distinctly claimed in the concluding portion of the specification. The invention, however, both as to organization and method of operation may best be understood by reference to the following description taken in connection with the accompanying drawings, in which:

Figure 6:
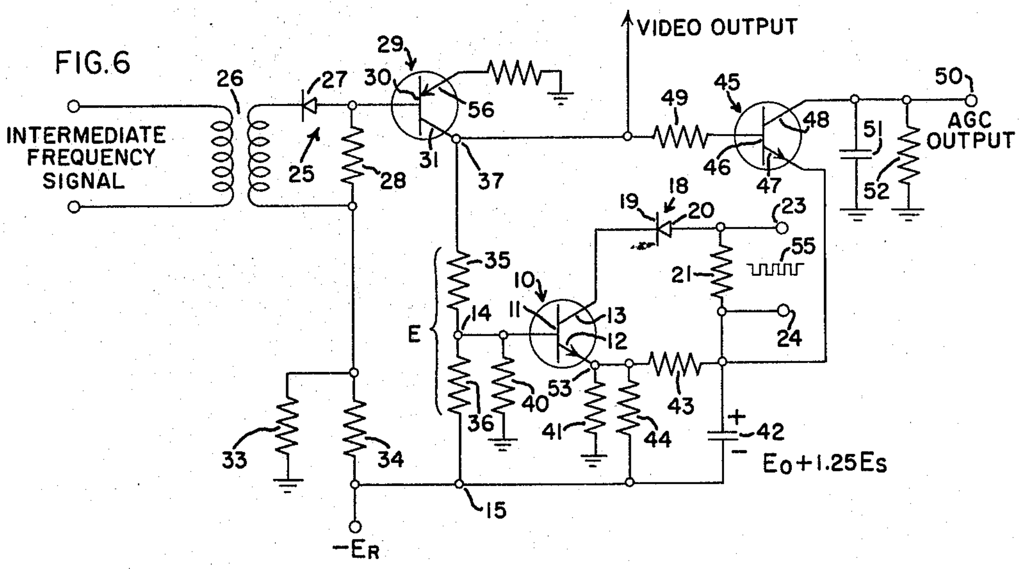
Figure 7:
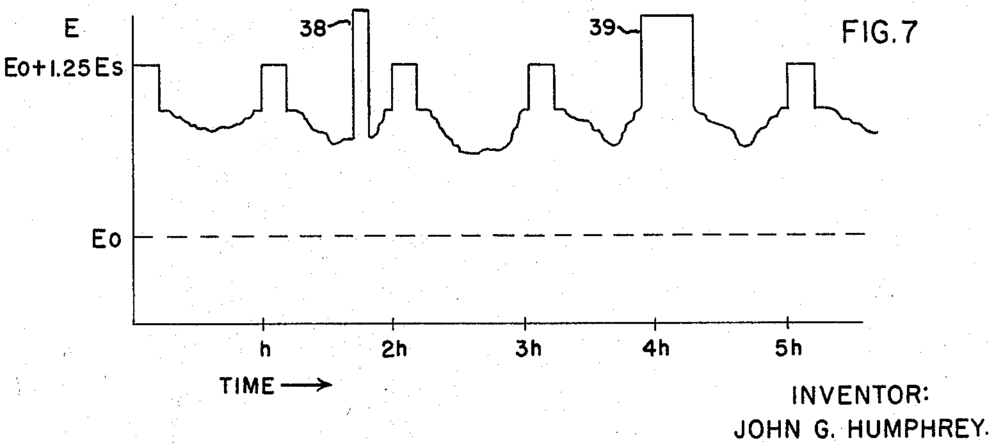

FIGURE 6 is a circuit diagram of a synchronizing signal separator circuit in a television receiver incorporating the amplitude-discriminating signal transfer circuit of the invention and providing for automatic adjustment of the transfer characteristic in accordance with variations in received signal strength; and FIGURE 7 illustrates an input waveform for the synchronizing signal separator circuit of FIGURE 6.

Figure 1:
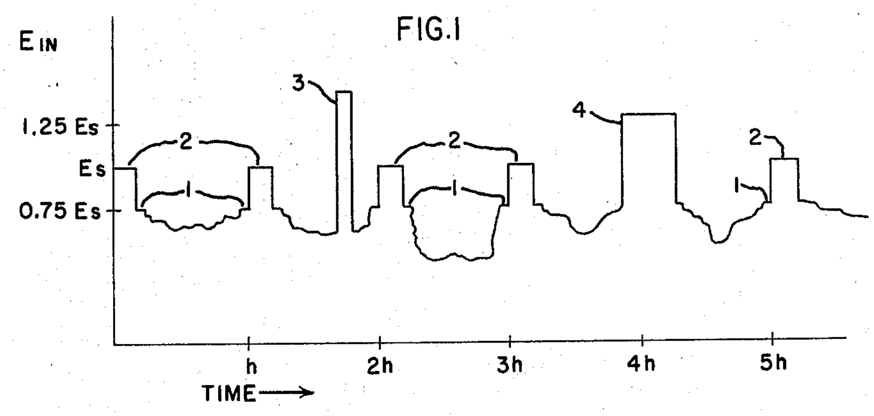
FIGURE 1 illustrates the waveform of a demodulated television signal available at the output of the second detector in a television receiver with noise pulses superimposed thereon.

With reference to FIGURE 1, the waveform of a demodulated composite video signal, available at the output of the second detector in a television receiver, includes blanking pulses 1 with synchronizing pulses 2 superimposed upon the blanking pulses. Video information is present between the blanking pulses. FIGURE 1 illustrates the waveform for several horizontal periods *h*. The peak amplitude of the synchronizing pulses, which is the peak amplitude of the demodulated video signal, is designated $E_s$. The amplitude of the blanking pulses, in accordance with present television standards, is 75% of the maximum envelope amplitude and is therefore designated $0.75E_s$. Large amplitude noise pulses, designated 3 and 4, are superimposed on the composite video signal, the latter noise pulse coinciding with and masking a synchronizing pulse.

Figure 2:
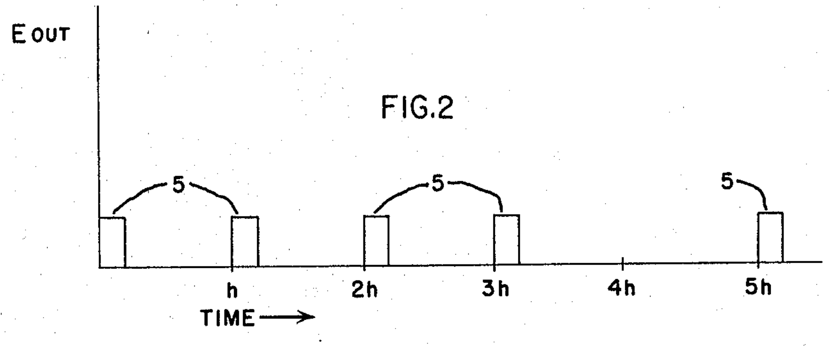
FIGURE 2 illustrates the waveform of the desired output of a synchronizing signal separator circuit in response to the input signal of FIGURE 1.

The composite video signal output of the second detector is supplied, in a standard television receiver, to a synchronizing signal separator circuit. It is desirable that the portions of the signal waveform illustrated in FIGURE 1 having an amplitude below $0.75E_s$ which represent video information be eliminated from an output signal of the separator circuit. It is further desirable that the large amplitude noise pulses 3 and 4 be similarly eliminated from an output signal of the separator circuit, since these pulses can upset either the horizontal or vertical sweep circuit synchronization with resulting picture distortion. Thus, the desirable output waveform of the synchronizing signal separator circuit for the video signal waveform input illustrated in FIGURE 1 comprises a series of uniform-amplitude pulses 5 having the periodicity and width of the original synchronizing pulses, as shown in FIGURE 2. The absence of a synchronizing pulse at a 4th horizontal period will not appreciably affect synchronization.

Figure 3:
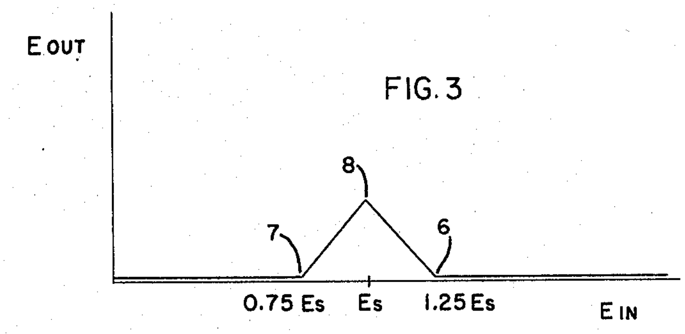
FIGURE 3 illustrates a transfer characteristic which is desirable in a signal transfer circuit, e.g. a synchronizing signal separator circuit, in order to obtain the output of FIGURE 2 in response to the input of FIGURE 1.

The output signal waveform of FIGURE 2 may be attained with the input signal waveform of FIGURE 1 if the synchronizing signal separator circuit has a transfer characteristic such as illustrated in FIGURE 3. The upper limit 6 of the signal output range of the transfer characteristic, $1.25E_s$, is arbitrary and is chosen because, statistically, the amplitudes of most superimposed noise pulses exceed this value. Other upper limit values, either less than or greater than $1.25E_s$ may be employed. The lower limit 7 of the transfer characteristic corresponds to the blanking pulse level, while the peak 8 corresponds to the synchronizing pulse level. Thus, the maximum output of a circuit having the transfer characteristic of FIGURE 3 occurs at input signal amplitudes equal to $E_s$, while the output is zero for input signal amplitudes less than $0.75E_s$ or greater than $1.25E_s$.

Figure 4:
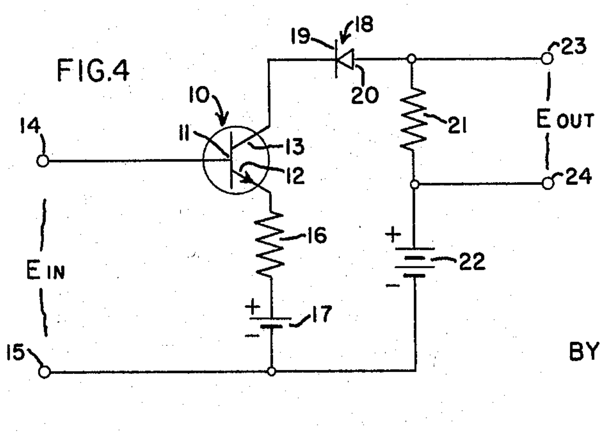
FIGURE 4 is a circuit diagram of an amplitude-discriminating signal transfer circuit in accordance with the invention.

In FIGURE 4 there is illustrated the amplitude-discriminating signal transfer circuit of the invention which has a transfer characteristic similar to that illustrated in FIGURE 3. The signal transfer circuit includes an NPN-type transistor 10 having a base electrode 11, an emitter electrode 12, and a collector electrode 13. The input signal, which may be a composite video signal as previously discussed, is impressed between terminals 14 and 15. The serial combination of resistor 16 and D.C. voltage source 17 is connected between emitter 12 and terminal 15. A diode 18 having a cathode 19 and an anode 20 is serially connected with resistor 21 and D.C. voltage source 22 between collector electrode 13 and terminal 15. The type of transistor 10 may be varied, as known in the art, with corresponding modification of the polarities of D.C. voltage sources 17 and 22 and diode 18. A pair of output terminals 23 and 24 are connected across resistor 21.

In order that the present invention may be fully understood and analyzed, a mathematical analysis of the circuit of FIGURE 4 follows. For simplifying the analysis, the following assumptions which are approximately true for actual junction transistors and diodes, are made. The diodes represented by the emitter-to-base and collector-to-base junction of the transistor 10 as well as the diode 18 are ideal, i.e., the diodes have zero impedance when biased in the direction for foward conduction. When the biases on the transistor are of the polarities normal for a transistor, i.e., the emitter-to-base junction is forward biased and the collector-to-base junction reverse biased, the resultant transistor has an $\alpha$ of unity. With these assumptions in mind, let:

$e_{13}$=voltage of collector 13 with respect to terminal 15,
$e_{12}$=voltage of emitter 12 with respect to terminal 15,
$i_{13}$=collector current of transistor 10,
$E_{17}$=value of D.C. voltage source 17,
$E_{22}$=value of D.C. voltage source 22,
$R_{16}$=value of resistor 16,
$R_{21}$=value of resistor 21,
$E_{in}$=instantaneous value of input voltage applied to terminal 14 with respect to terminal 15,
$E_{out}$=instantaneous value of output voltage at terminal 24 with respect to terminal 23.

Figure 5:
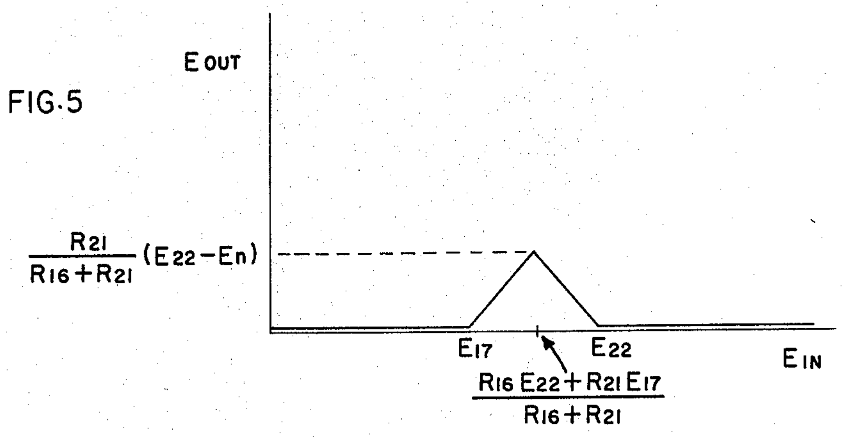
FIGURE 5 illustrates the transfer characteristic of the circuit of FIGURE 4.

In operation, with $E_{22}>E_{17}$, when $E_{in}<E_{17}$, both the emitter-base junction and the collector-base junction of transistor 10 are reverse-biased and $E_{out}$ is substantially 0, as illustrated in FIGURE 5.

When $E_{in}=E_{17}$, normal transistor operation commences, i.e., the emitter-base and collector-base junctions are forward and reverse biased respectively, and transistor 10 begins to function as a common emitter amplifier. During normal transistor operation, $$e_{12}=E_{in} \qquad (1)$$

$$e_{13}=E_{22}-i_{13}R_{21} \qquad (2)$$

$$i_{13}=\frac{E_{in}-E_{17}}{R_{16}} \qquad (3)$$

Substituting (3) into (2), $$e_{13}=E_{22}-(E_{in}-E_{17})\left(\frac{R_{21}}{R_{16}}\right) \qquad (4)$$

The limit of normal transistor action occurs when $E_{in}$ has increased sufficiently to cause $$e_{13}=e_{12} \qquad (5)$$

Substituting (1) and (4) into (5), the limiting value of $E_{in}$ for normal transistor operation is found to be $$E_{in}=\frac{R_{16}E_{22}+R_{21}E_{17}}{R_{16}+R_{21}} \qquad (6)$$

Thus, when $$E_{17}\leq E_{in}\leq\frac{R_{16}E_{22}+R_{21}E_{17}}{R_{16}+R_{21}}$$

$$E_{out}=\left(\frac{R_{21}}{R_{16}}\right)(E_{in}-E_{17}) \qquad (7)$$

The value of $E_{out}$ corresponding to the maximum value of $E_{in}$ within the range of normal transistor operation is thus given by $$E_{out}=\left(\frac{R_{21}}{R_{16}+R_{21}}\right)(E_{22}-E_{17}) \qquad (8)$$

When $$\frac{R_{16}E_{22}+R_{21}E_{17}}{R_{16}+R_{21}}<E_{in}<E_{22}$$

both the emitter-base junction and the collector-base junction of transistor 10 are biased in the forward direction and $$E_{out}=E_{22}-E_{in} \qquad (9)$$

In accordance with Equation 9, $E_{out}$ falls to substantially zero when $$E_{in}=E_{22} \qquad (10)$$

If diode 18 were not present in the circuit, the polarity of $E_{out}$ would reverse when the value of $E_{in}$ exceeded $E_{22}$ due to reversal of the current flow in resistor 21. Diode 18 prevents current reversal and thus, when $$E_{in}\geqq E_{22}$$

$$E_{out}=\text{substantially } 0 \qquad (11)$$

The transfer characteristic of the amplitude-discriminating signal transfer circuit of FIGURE 4 is thus similar to the desired transfer characteristic, as illustrated in FIGURE 3. The voltage and resistance values necessary in the signal transfer circuit of FIGURE 4 to render the FIGURE 3 and FIGURE 5 transfer characteristics identical may be easily calculated, Thus, $$E_{17}=0.75E_s \quad (12)$$

$$\frac{R_{16}E_{22}+R_{21}E_{17}}{R_{16}+R_{21}}=E_s \quad (13)$$

$$E_{22}=1.25E_s \quad (14)$$

Substituting (12) and (14) into (13)

$$\frac{1.25R_{16}+0.75R_{21}}{R_{16}+R_{21}}=1 \quad (15)$$

which yields $$R_{16}=R_{21} \quad (16)$$

Equations 12, 14, and 16 therefor express the conditions under which the signal transfer circuit of FIGURE 4 yields the desired transfer characteristic illustrated in FIGURE 3.

However, the amplitude-discriminating signal transfer circuit of the invention, illustrated in FIGURE 4, is not limited to the symmetrical transfer characteristic of FIGURE 3. The upper and lower limits 6 and 7 respectively may be chosen so that the transfer characteristic is non-symmetrical, i.e., has different slopes on either side of the peak 8. To attain a desired non-symmetrical transfer characteristic, the following relationship of component values in the circuit of FIGURE 4 obtains:

$$E_{17}=hE_s \text{ where } h<1 \quad (17)$$

$$\frac{R_{16}E_{22}+R_{21}E_{17}}{R_{16}+R_{21}}=E_s \quad (18)$$

$$E_{22}=kE_s \text{ where } k>1 \quad (19)$$

Substituting (17) and (19) into (18)

$$\frac{R_{16}}{R_{21}}=\frac{1-h}{k-1} \quad (20)$$

Equation 20 expresses the relationship between $R_{16}$ and $R_{21}$ necessary to obtain the desired transfer characteristics as expressed by Equations 17, 18, and 19.

The amplitude-discriminating signal transfer circuit of FIGURE 4 functions satisfactorily when the input signal amplitudes for which it is desirable to derive an output are substantially constant. In a conventional television receiver, however, the strength of the received signal varies and hence the peak amplitude of the synchronizing pulses changes accordingly. In accordance with a feature of the invention, the amplitude-discriminating signal transfer circuit of the invention includes means for automatically shifting the upper and lower limits of the transfer characteristic in accordance with variations in the input signal level, e.g., variations in the peak amplitude of the synchronizing pulses in a television receiver due to variations in received signal strength. FIGURE 6 illustrates a synchronizing signal separator circuit in a television receiver employing the amplitude-discriminating signal transfer circuit of the invention and incorporating such means.

Referring to FIGURE 6, an intermediate frequency signal in a television receiver is coupled to video detector 25 through transformer 26. Video detector 25, which derives the composite video signal from the received carrier wave, comprises diode 27 and load resistor 28 serially connected across the secondary winding of transformer 26. The video signal, developed across load resistor 28, is applied to a video amplifier comprising PNP-type transistor 29 having a base 30, a collector 31, and an emitter 32, base 30 being connected to the common connection of resistor 28 and diode 27. A slight initial forward bias is applied to transistor 29 by means of a voltage divider comprising resistors 33 and 34 connected across the negative supply voltage $E_R$ in the receiver. This forward bias is necessary to prevent compression of the white video information in transistor 29.

The connection of emitter 32 of transistor 29 to ground may be completed through a resistor 56 as shown, if such a resistor is found necessary to achieve a high input impedance for the transistor 29, to linearize its transfer characteristic, or to achieve thermal stability of its operating point.

The amplified video signal output voltage E of transistor 29 appears across resistors 35 and 36 serially connected between collector 31 and the negative supply. The waveform of the output voltage E present at circuit point 37, i.e. the common connection of collector 31 and resistor 35, is illustrated in FIGURE 7. The D.C. component $E_0$ of voltage E is due to the slight initial forward bias of video amplifier transistor 29. The portion of video amplifier output voltage E in excess of $E_0$ represents the composite video signal, the peak value of the synchronizing pulses contained in this portion of the signal being designated $1.25E_s$. The absolute magnitude of the synchronizing pulse peaks is therefore $E_0+1.25E_s$. As in the waveform of FIGURE 1, noise pulses 38 and 39 having peak amplitudes appreciably greater than the synchronizing pulse amplitude are superimposed on the signal. Elimination of noise pulses 38 and 39 from the synchronizing signal separator circuit output is effected, in the FIGURE 6 embodiment, by employing a synchronizing signal separator circuit embodying the principles of the FIGURE 4 circuit, previously described.

The synchronizing signal separator portion of the circuit will be described utilizing the reference numerals of FIGURE 4, where applicable, to indicate correspondence of the components. Thus, NPN-type transistor 10, input terminals 14 and 15, diode 18, resistor 21, and output terminal 23 and 24 correspond in connection and in function to the same components in the FIGURE 4 embodiment. Resistors 40 and 41 are connected between base 11 and emitter 12 respectively of transistor 10 and grounded to provide proper biasing for these electrodes in the presence of D.C. component $E_0$.

Automatic compensation for variations in received signal strength is effected by capacitor 42, connected between output terminal 24 and the negative supply voltage $E_R$, and resistors 43 and 44 serially connected across capacitor 42. The common connection of resistors 43 and 44 is connected to emitter 12.

Capacitor 42 is charged by NPN-type transistor 45 having base 46, emitter 47, and collector 48. The amplified composite video signal E available at circuit point 37 is applied to base 46 of transistor 45 through resistor 49. Emitter 47 is connected to the common connection of capacitor 42 and resistor 43 while collector 48 is connected directly to AGC output terminal 50. Collector 48 is connected to ground through a parallel network comprising capacitor 51 and resistor 52.

Transistor 45 is rendered conductive by the signal E present at circuit point 37 and the resulting current flow through transistor 45 charges capacitor 42 to a D.C. voltage having a magnitude $E_0+1.25E_s$, i.e the peak amplitude of the signal at circuit point 37. The polarity of the voltage appearing across capacitor 42 is such as to render the common connection of capacitor 42 and resistor 43 positive with respect to the common connection of capacitor 42 and resistor 44. The presence of resistor 49 in the base circuit of transistor 45 prevents the D.C. voltage across capacitor 42 from being changed appreciably by relatively short duration noise pulses, such as noise pulses 38 and 39 shown in FIGURE 7.

The voltage $E_0+125E_s$ impressed on capacitor 42 is the supply voltage for synchronizing signal separator transistor 10 and performs the function of both D.C. sources 17 and 22 in the FIGURE 4 embodiment. In the collector circuit of transistor 10, capacitor 42 is equivalent to D.C. source 22 in FIGURE 4, since the voltage on capacitor 42, applied to collector 13 through resistor 21 and diode 18, is $1.25E_s$ plus a D..C. voltage $E_0$. The effect of D.C. voltage $E_0$ is neutralized since $E_0$ is also applied to emitter 12 and base 11 of transistor 10.

In the emitter circuit of transistor 10, the emitter resistor 16 in the FIGURE 4 embodiment is replaced by a network comprising resistors 41, 43, and 44. The values of the latter resistors must be chosen so that their equivalent resistance is equal to that of resistor 21 as in FIGURE 4. In addition, the voltage at circuit point 53, the common connection of resistors 41, 43, and 44, if emitter 12 were temporarily disconnected therefrom, must be $E_0+0.75E_s$ with respect to input terminal 15. Thus, the following must obtain relations:

Equating the resistances:

$$\frac{1}{R_{41}}+\frac{1}{R_{43}}+\frac{1}{R_{44}}=\frac{1}{R_{21}} \quad (21)$$

where $R_{41}$=value of resistor 41,
$R_{43}$=value of resistor 43,
$R_{44}$=value of resistor 44,
$R_{21}$=value of resistor 21.

Applying Kirchoff's Law to the network comprising resistors 41, 43, 44 and capacitor 42 and assuming the existence of the voltage $E_0+0.75E_s$ across resistor 44 when the emitter current of transistor 10 is zero:

$$(-E_R+E_0+0.75E_s)\left(\frac{1}{R_{41}}\right)+(-0.5E_s)\left(\frac{1}{R_{43}}\right)+(E_0+0.75E_s)\left(\frac{1}{R_{44}}\right)=0 \quad (22)$$

Equation 22 must be true regardless of the value $E_s$; hence $$\frac{0.75}{R_{41}}-\frac{0.5}{R_{43}}+\frac{0.75}{R_{44}}=0 \quad (23)$$

Substituting Equation 23 into Equation 22

$$-\frac{E_R}{R_{41}}+E_0\left(\frac{1}{R_{41}}+\frac{1}{R_{44}}\right)=0 \quad (24)$$

In the design of the circuit of FIGURE 6, the negative supply voltage in the receiver $E_R$ and the value of the D.C. component $E_0$ will generally be known. Hence, Equations 21, 23, and 24 represent three equations in the four unknown quantities $R_{41}$, $R_{43}$, $R_{44}$, and $R_{21}$. In solving these equations, an arbitrary choice will usually be made for resistor 21. As in the FIGURE 4 embodiment, the transfer characteristic may be made non-symmetrical by appropriate choice of voltage and resistance values.

In accordance with the above derivation and description, the upper and lower limits of the transfer characteristic of the synchronizing signal separator circuit vary in accordance with the charge on capacitor 42 which is a function of the received signal strength. The upper limit of the transfer characteristic is fixed at the peak value of the synchronizing pulses of the amplified composite video signal portion of the voltage available at circuit point 37, this value having been designated $1.25E_s$ in accordance with the FIGURE 3 transfer characteristic. The input signal to base 11 of transistor 10 is rendered compatible with the established transfer characteristic by serially connected resistors 35 and 36 which function as a voltage divider to reduce the peak amplitude of the synchronizing pulses in the video signal portion of the voltage applied to base 11 to $1.00E_s$ to correspond to the peak of the transfer characteristic. Thus, the values of resistors 35 and 36 must be proportioned so that the peak amplitude of the composite video signal voltage appearing at circuit point 14, which is the common connection of resistors 35 and 36, for application to base 11 is 0.8 of its value at circuit point 37. In addition, balancing of the D.C. component $E_0$ applied to collector 13 and emitter 12 by capacitor 42 requires that a D.C. potential equal to $E_0$ must also be applied to base 11 in order to eliminate $E_0$ from the output of the synchronizing signal separator. To this end since $$0.8E=0.8E_0+1.00E_s$$

an additional voltage equal to $0.2E_0$ must be present at circuit point 14 to render the voltage at point 14 equal to $E_0+E_s$.

Applying Kirchoff's Law to circuit point 14:

$$(-0.2E+0.2E_0)\left(\frac{1}{R_{35}}\right)+(0.8E+0.2E_0)\left(\frac{1}{R_{36}}\right)+(0.8E+0.2E_0-E_R)\left(\frac{1}{R_{40}}\right)=0 \quad (25)$$

Equation 25 must be true regardless of the value of E, hence $$-\frac{0.2}{R_{35}}+\frac{0.8}{R_{36}}+\frac{0.8}{R_{40}}=0 \quad (26)$$

Substituting Equation 26 into Equation 25

$$\frac{0.2E_0}{R_{35}}+\frac{0.2E_0}{R_{36}}+\frac{0.2E_0}{R_{40}}-\frac{E_R}{R_{40}}=0 \quad (27)$$

Equations 26 and 27 are only two equations in the three unknowns $R_{35}$, $R_{36}$, $R_{40}$. However, the sum of $R_{35}$ and $R_{36}$ will generally be fixed by the requirement that these two resistors in series function satisfactorily as a load resistance for transistor 29.

When the conditions represented by Equations 21, 23, 24, 26, and 27 are satisfied, transistor 10 and diode 18 function as in the FIGURE 4 embodiment and the synchronizing signal 55 free of spurious noise pulses will be obtained across resistor 21 regardless of the strength of the received signal.

In addition to effecting noise cancellation while separating the synchronizing signal from the composite video signal, the circuit illustrated in FIGURE 6 also furnishes a D.C. voltage proportional to received signal strength which may be utilized as an automatic gain control (AGC) signal in the television receiver. This AGC signal is available at terminal 50 since capacitor 51 is charged to a D.C. voltage proportional to the peak value of the synchronizing pulses when transistor 45 conducts.

Although the invention and its operation has been described with reference to specific embodiments, the invention is not to be limited to these embodiments. Many modifications will be obvious to those skilled in the art. It is thus intended that the invention not be limited to the particular details shown and described which may be varied without departing from the spirit and scope of the invention and the appended claims.

What is claimed as new and desired to be secured by Letters Patent of the United States is:

1. An amplitude-discriminating signal transfer circuit for producing an output signal when the input signal amplitude lies between a first value and a second value comprising:

(a) a semiconductor device having first, second, and third electrodes, (b) means for applying an input signal to said first electrode, (c) first resistance means connected to said second electrode, (d) second resistance means connected to said third electrode, (e) unilateral conducting means connected between said second resistance means and said third electrode of said semiconductor device, (f) means for applying to said second electrode through said first resistance means a potential substantially equal to said first value and for applying to said third electrode through said second resistance means a potential substantially equal to said second value, and (g) output means connected to said second resistance means for deriving the output signal.

2. The signal transfer circuit of claim 1 wherein said semiconductor device is a transistor and said first, second, and third electrodes are the base, emitter, and collector electrodes respectively of said transistor.

3. An amplitude-discriminating signal transfer circuit for producing an output signal when the input signal amplitude lies between a first value and a second value comprising:

(a) a transistor having a base, an emitter, and a collector,
(b) means for applying an input signal to said base,
(c) first resistance means connected to said emitter,
(d) a diode connected to said collector,
(e) second resistance means connected to said diode,
(f) means for applying to said emitter through said first resistance means a potential substantially equal to said first value and to said collector through said diode and said second resistance means a potential substantially equal to said second value, and
(g) output means connected to said second resistance means for deriving the output signal.

4. An amplitude-discriminating signal transfer circuit for producing an output signal when the input signal amplitude lies between a first value and a second value comprising:

(a) a transistor having first, second, and third electrodes,
(b) means for applying an input signal to said first electrode,
(c) a first series circuit comprising a first resistor and a first D.C. source having a potential substantially equal to said first value,
(d) means connecting said first series circuit to said second electrode,
(e) a diode connected to said third electrode,
(f) a second series circuit comprising a second resistor and a second D.C. source having a potential substantially equal to said second value,
(g) means connecting said second series circuit to said diode, and
(h) output means connected to said second resistor for deriving the output signal.

5. The signal transfer circuit of claim 4 in which the values of said first and said second resistors are substantially equal.

6. The signal transfer circuit of claim 4 in which $kE_1=hE_2$ and $R_1(k-1)=R_2(1-h)$ where $k$=a constant greater than 1
$h$=a constant less than 1
$E_1$=the potential of said first D.C. source
$E_2$=the potential of said second D.C. source
$R_1$=the value of said first resistor and
$R_2$=the value of said second resistor

7. An amplitude-discriminating signal transfer circuit for producing an output signal when the input signal amplitude lies between a first value and a second value comprising:

(a) a transistor having a base, an emitter, and a collector,
(b) means for applying an input signal to said base,
(c) a first resistor having one terminal connected to said emitter,
(d) a first D.C. source having a potential substantially equal to said first value connected to the other terminal of said first resistor,
(e) a diode connected to said collector,
(f) a second D.C. source having a potential substantially equal to said second value,
(g) a second resistor connected between said diode and said second D.C. source, and
(h) output means connected to said second resistor for deriving the output signal.

8. An amplitude-discriminating signal transfer circuit for producing an output signal when the input signal lies in a predetermined range defined by a first value and a second value, said first and second values being simultaneously variable to change the limits of said range, comprising:

(a) a transistor having first, second, and third electrodes,
(b) means for applying an input signal to said first electrodes,
(c) first resistance means connected to said second electrode,
(d) a diode connected to said third electrode,
(e) a second resistance means connected to said diode,
(f) variable means for applying to said second electrode through said first resistance means a potential substantially equal to said first value and to said third electrode through said diode and said second resistance means a potential substantially equal to said second value, and
(g) output means connected to said second resistance means for deriving the output signal.

9. In a television receiver, a noise-cancelling synchronizing signal separator circuit for producing a synchronizing pulse output when the input signal peak amplitude lies in a predetermined range defined by a lower limit and an upper limit, said lower and said upper limits being simultaneously variable to change the limits of said range in accordance with the received signal strength as represented by the demodulated video signal peak amplitude, comprising:

(a) a transistor having first, second, and third electrodes,
(b) means for applying said demodulation video signal to said first electrode,
(c) first resistance means connected to said second electrode,
(d) a diode connected to said third electrode,
(e) second resistance means connected to said diode,
(f) a capacitor connected to said first and said second resistance means,
(g) means for charging said capacitor to the peak amplitude of the demodulated video signal, said peak amplitude being applied to said third electrode through said diode and said second resistance means to fix the upper limit of said predetermined range, and to said second electrode through said first resistance means to fix the lower limit of said predetermined range, and
(h) output means connected to said second resistance means for deriving the synchronizing pulse output.

10. In a television receiver, a noise-cancelling synchronizing signal separator circuit for producing a synchronizing pulse output when the input signal peak amplitude lies in a predetermined range defined by a lower limit and an upper limit, said lower and said upper limits being simultaneously variable to change the limits of said range in accordance with the received signal strength as represented by the demodulated video signal peak amplitude, comprising:

(a) a transistor having first, second, and third electrodes,
(b) means for applying a predetermined proportion of said demodulated video signal to said first electrode,
(c) first resistance means comprising a first resistor serially connected to a second resistor,
(d) means connecting the common connection of said first and said second resistors to said second electrode,
(e) a diode connected to said third electrode,
(f) a third resistor having one terminal connected to said diode, (g) a capacitor connected to the other terminal of said third resistor, (h) means connecting said first resistance means across said capacitor, (i) means for charging said capacitor to the peak amplitude of the demodulated video signal, said peak amplitude being applied to said third electrode through said diode and said third resistor to fix the upper limit of said predetermined range, and to said second electrode through said first resistance means to fix the lower limit of said predetermined range, and (j) output means connected to said third resistor for deriving the synchronizing pulse output.

11. In a television receiver, a noise-cancelling synchronizing signal separator circuit for producing a synchronizing pulse output when the input signal peak amplitude lies in a predetermined range defined by a lower limit and an upper limit, said lower and said upper limits being simultaneously variable to change the limits of said range in accordance with the received signal strength as represented by the demodulated video signal peak amplitude comprising:

(a) a first transistor having a base, an emitter, and a collector, (b) means for applying a predetermined proportion of said demodulated video signal to said base, (c) first resistance means comprising a first resistor serially connected to a second resistor, (d) means connecting the common connection of said first and said second resistors to said emitter, (e) a diode connected to said collector, (f) a third resistor having one terminal connected to said diode, (g) a capacitor connected to the other terminal of said third resistor, (h) means connecting said first resistance means across said capacitor, (i) a second transistor having first, second and third electrodes, (j) means for applying said demodulated video signal to said first electrode to render said second transistor conductive in response thereto, (k) means connecting said second electrode of said second transistor to the common connection of said third resistor and said capacitor to charge said capacitor to the peak amplitude of the demodulated video signal, said peak amplitude being applied to said collector of said first transistor through said diode and said third resistor to fix the upper limit of said predetermined range, and to said emitter of said first transistor through said first resistance means to fix the lower limit of said predetermined range, (l) means connected to said third electrode of said second transistor for deriving an automatic gain control potential proportional to received signal strength, and (m) output means connected to said third resistor for deriving the synchronizing pulse output.

References Cited by the Examiner

UNITED STATES PATENTS 2,878,312 3/1959 Goodrich ----------- 178—7.5

DAVID G. REDINBAUGH, *Primary Examiner.*

J. McHUGH, *Assistant Examiner.*